United States Patent
Wolfe et al.

(10) Patent No.: US 8,210,844 B2
(45) Date of Patent: Jul. 3, 2012

(54) AIR IMPINGEMENT CONVEYOR OVEN

(75) Inventors: Ronald D. Wolfe, Wichita, KS (US);
Frederick Hausler, Emporia, KS (US);
Brent Staver, Maize, KS (US)

(73) Assignee: Wolfe Electric, Inc., Wichita, KS (US)

( * ) Notice: Subject to any disclaimer, the term of this patent is extended or adjusted under 35 U.S.C. 154(b) by 898 days.

(21) Appl. No.: 12/259,132

(22) Filed: Oct. 27, 2008

(65) Prior Publication Data
US 2010/0104997 A1  Apr. 29, 2010

(51) Int. Cl.
F27B 9/06 (2006.01)
(52) U.S. Cl. ........ 432/144; 432/145; 432/152; 99/443 C
(58) Field of Classification Search .................. 432/121, 432/135, 136, 137, 144, 145, 148, 149, 152; 99/389, 401, 403, 443 C, 443 R
See application file for complete search history.

(56) References Cited

U.S. PATENT DOCUMENTS

| | | | |
|---|---|---|---|
| 1,699,067 A | 1/1929 | Holmgren | |
| 4,538,530 A | 9/1985 | Whitman | |
| 4,964,392 A * | 10/1990 | Bruno et al. ................. | 126/21 A |
| 5,277,105 A | 1/1994 | Bruno et al. | |
| 5,361,749 A | 11/1994 | Smith et al. | |
| 6,131,411 A * | 10/2000 | Schnabel, Jr. .................. | 65/111 |
| RE36,941 E * | 11/2000 | Wolfe et al. .................. | 99/443 C |
| 6,192,877 B1 * | 2/2001 | Moshonas et al. .......... | 126/21 A |
| 6,267,587 B1 * | 7/2001 | Bishop et al. ................. | 432/121 |
| 6,539,934 B2 * | 4/2003 | Moshonas et al. .......... | 126/21 A |
| 6,655,373 B1 * | 12/2003 | Wiker ......................... | 126/21 A |
| 7,604,000 B2 * | 10/2009 | Wolfe et al. .................. | 126/21 A |
| 2007/0012307 A1 | 1/2007 | Wiker et al. | |
| 2008/0216812 A1 * | 9/2008 | Dougherty ................... | 126/21 A |
| 2008/0257172 A1 * | 10/2008 | Duckworth et al. ........ | 99/443 R |

* cited by examiner

*Primary Examiner* — Gregory A Wilson
(74) *Attorney, Agent, or Firm* — Kenneth H. Jack; Davis & Jack, LLC

(57) ABSTRACT

An air impingement conveyor oven incorporating a baking case having an interior space bordered by opposing longitudinal walls, opposing lateral walls, a ceiling, and a floor; an air plenum partitioning the baking case's interior space into an air impingement space and an air return space, the air plenum having at least a first intake port opening at the air return space, the air plenum further having a plurality of air impingement ducts extending into and opening at the air impingement space; a passive flow conduit opening the baking case, the passive flow conduit having an output end positioned at the return air space; a combustible fuel injector and igniter connected operatively to the passive flow conduit; and an air impelling fan mounted operatively within the baking case's interior space for recirculating impingement air from the air impingement space into the air return space, for drawing outside combustion air through the passive flow conduit, and for driving the air through the at least first intake port into the air plenum.

32 Claims, 6 Drawing Sheets

AIR IMPINGEMENT CONVEYOR OVEN

FIELD OF THE INVENTION

This invention relates to air impingement conveyor ovens. More particularly, this invention relates to air circulation assemblies and burner and heating assemblies of such ovens.

BACKGROUND OF THE INVENTION

A major structural component of a commonly configured air impingement conveyor oven comprises a thermally insulated box type baking case having an upper wall or ceiling, a lower wall or floor, a lateral or side wall, an oppositely lateral or opposite side wall, a longitudinal or end wall, and an oppositely longitudinal or opposite end wall. Such baking case's longitudinal and oppositely longitudinal walls typically include laterally oblongated food passage ports through which a cooking rack type continuous loop food conveyor longitudinally extends. In operation of such typically configured air impingement food conveyor, food items such as pizzas may be placed upon the conveyor at its longitudinal end. The food items are then carried by the conveyor into the baking case through the food passage port within the baking case's longitudinal wall, and are further carried across the interior of the baking case. The food items are then carried out of the baking case through the food passage port within the baking case's oppositely longitudinal wall. In order to preserve the heating and cooking efficiency of such conveyor ovens, the opening sizes of the food passage ports are typically minimized (consistent with providing clearance for the size of food items to be cooked), and other structures such as apertures, ports, conduits, gapped seams and joints, and the like which may further open the baking case to the outside room environment are typically eliminated.

A further structural component of such typically configured air impingement conveyor ovens comprises an air intake manifold or air plenum mounted within the baking case between the baking case's lateral or back wall and the lateral side of the food conveyor. Such air plenum typically has one or more air intake ports opening the plenum's lateral wall, and such air plenum typically has a plurality of air duct outlets or ports which open the plenum's oppositely lateral wall. A plurality of air impingement "finger" ducts are also typically provided, a proximal end of each such duct communicating with one of the air plenum's air duct outlets. Such finger ducts typically extend oppositely laterally from the air plenum to positions overlying and/or underlying the food conveyor. Such finger ducts also typically include registers configured and positioned to direct jets of impingement air downwardly and/or upwardly toward the food conveyor and against the food items carried thereon. Typically, a blower or fan is operatively mounted at the air plenum's air intake port for drawing air from the air volume at the lateral side of the air plenum into the air plenum, and for driving such air oppositely laterally through the air ducts outlets for forced air impingement cooking of the food items carried on the conveyor.

The combined action and operation of the above described air blower, air plenum, and finger ducts assembly within such typically configured air impingement conveyor oven tends to create turbulence and a significant air pressure differential between the laterally divided portions of the baking case's interior space. In such ovens, a low pressure air volume is created by such assembly at the lateral side of the air plenum, and a corresponding high pressure air volume is created at the oppositely lateral side of the air plenum. As a result of such air turbulence and air volume air pressure differential, the desirable hermetic character of the walls of the baking case, as discussed above, has enhanced importance. Conduits, ports, or apertures which are allowed to open a wall of the baking case at the case's oppositely lateral high pressure side are generally known to emit heated air from the baking case, and to thereby undesirably lower the cooking efficiency of the oven. Likewise, conduits, ports, or apertures which are allowed to open the baking case at the case's low pressure lateral side tend to undesirably aspirate cool outside air into the baking case, similarly diminishing the cooking efficiency of the oven. The longitudinally positioned food passage ports discussed above constitute a necessary exception to the known and conventionally understood baking case design criteria requiring that the walls of the baking case be hermetic and imperforate.

As a result of such air pressure differences and turbulence generated by such baking case mounted blower, air plenum, and finger duct assemblies, oven designers and fabricators have traditionally been motivated to maximize the hermetic and imperforate character of all of the walls of the oven's case. In contrast with and counter to such traditional design motivation, the instant invention provides at least a first, and preferably first and second open air flow conduits (in addition to the requisite longitudinal wall opening food passage ports discussed above), each open air flow conduit extending through one of the baking case's walls. Yet, the instant invention inter-positions such open air flow conduits and associates burner components in a manner which counters the commonly understood undesirability of extending open conduits through oven walls, and in a manner which enhances rather than diminishes the overall efficiency of the oven.

BRIEF SUMMARY OF THE INVENTION

A first structural component of the instant inventive air impingement conveyor oven comprises a baking case having a longitudinal wall, an oppositely longitudinal wall, a lateral wall, and having an oppositely lateral wall. Preferably, the baking case has laterally oblongated food passage ports which respectively open the interior of the baking case to the outside environment at the case's longitudinal and oppositely longitudinal walls. A continuous loop food conveyor is preferably provided and is arranged to extend through the baking case and between the two food passage ports, such conveyor preferably being of a cooking rack type which includes an open grid of interlinking wires or bars.

A further structural component of the instant inventive air impingement conveyor oven comprises an air plenum which is fixedly mounted within the baking case. The air plenum is preferably spaced laterally from the lateral edge of the food conveyor and is positioned oppositely laterally from the baking case's lateral or back wall. Such between positioning of the air plenum with respect to the conveyor and the baking case's lateral wall generally defines and causes the air plenum to border a laterally positioned air volume within the baking case, such air volume being situated between the air plenum and the baking case's lateral wall.

The air plenum component of the instant inventive air impingement conveyor oven typically includes at least a first air intake port which opens the air plenum at and through its lateral side wall. Such air plenum is preferably further opened at its oppositely lateral wall by a plurality of air outlet ports, such ports preferably being arranged at elevations within the baking case overlying and underlying the elevation of the food conveyor. A plurality of finger ducts having upwardly and downwardly directed air impingement jet forming registers are preferably associated with the air plenum so that the proximal air intake end of each finger duct communicates with one of the air plenum's outlet ports, and so that each finger duct cantilevers oppositely laterally into the air space defined by and laterally bordered by the air plenum. Separate pluralities of such finger ducts preferably overlie and underlie the conveyor for two directional air impingement.

Air impelling means such as a rotary radial blade fan or a barrel type Scirocco fan are preferably provided. Such means are preferably operatively mounted within the baking case so that it may draw air from the lateral air volume into the interior of the air plenum through its at least first air intake port. Such air is then further driven by the impelling means oppositely laterally through the air plenum and out of the air plenum through its outlet ports, and thence into the finger ducts for forced air impingement against food items carried by the food conveyor. The operation of such air impelling means inherently creates a low air pressure zone at the air return or lateral air volume, and such operation correspondingly and simultaneously creates a high air pressure zone at the oven's oppositely laterally positioned air volume.

According to the instant invention, at least a first, and preferably first and second, open passages or passive air flow conduits extending through one of the walls of the baking case are provided, such conduits being positioned so that outside room air aspirates therethrough into the baking case's low pressure air return space.

Where first and second passive air flow conduits are provided, the first passive air flow conduit preferably comprises an air cooled section at such conduit's inner end, and such air cooled section preferably passes through or intersects the second passive air flow conduit. Also, according to the instant invention, means for injecting combustible fuel, such as natural gas or propane, into an intake end of such first passive air flow conduit are provided along with ignition means. Also according to the instant invention, no separate motor driven blower for driving combustion air into an oven burner or for driving cooling air into a cooling tube is provided, the instant invention beneficially utilizing the air pressure differential generated by the plenum fan or blower to at least dually function as means for recirculating impingement air and inwardly drawing combustion air through the first passive air flow conduit, and preferably utilizes such differential to perform triple functions which further include drawing cooling air through the second passive air flow conduit and about the first conduit's air cooled section.

In the instant invention, efficiencies resulting from elimination of all separate motor driven burner blower and air cooling components outweigh inefficiencies which inherently result from the provision of a open conduits extending through the wall of the baking case. Accordingly, the instant inventive oven provides enhanced efficiencies over traditionally configured and outfitted air impingement conveyor ovens. Thus, it is an object of the instant invention to provide an air impingement conveyor oven having at least a first, and preferably first and second, open or passive air flow conduits extending through the oven's baking case at a low air pressure side of the baking case, to eliminate any and all separate burner blower and air cooling blower components, to operatively associate burner structures with the first passive air flow conduit, and to extend for purposes of air cooling a portion of the first passive air flow conduit through the second passive air flow conduit.

Other and further objects, benefits, and advantages of the instant invention have been set forth and described above, and will become known to those skilled in the art upon review of the Detailed Description which follows, and upon review of the appended drawings.

DETAILED DESCRIPTION OF A PREFERRED EMBODIMENT

Figure 1:
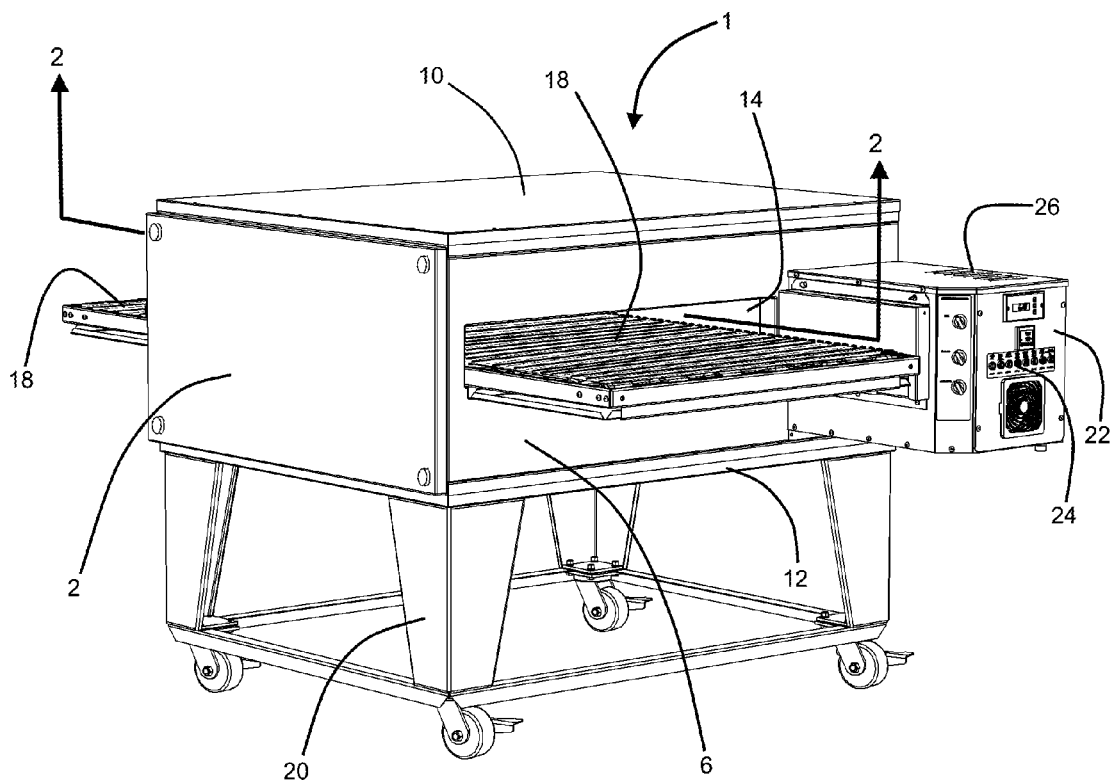
FIG. 1 is a perspective view of the instant inventive air impingement conveyor oven.
Figure 2:
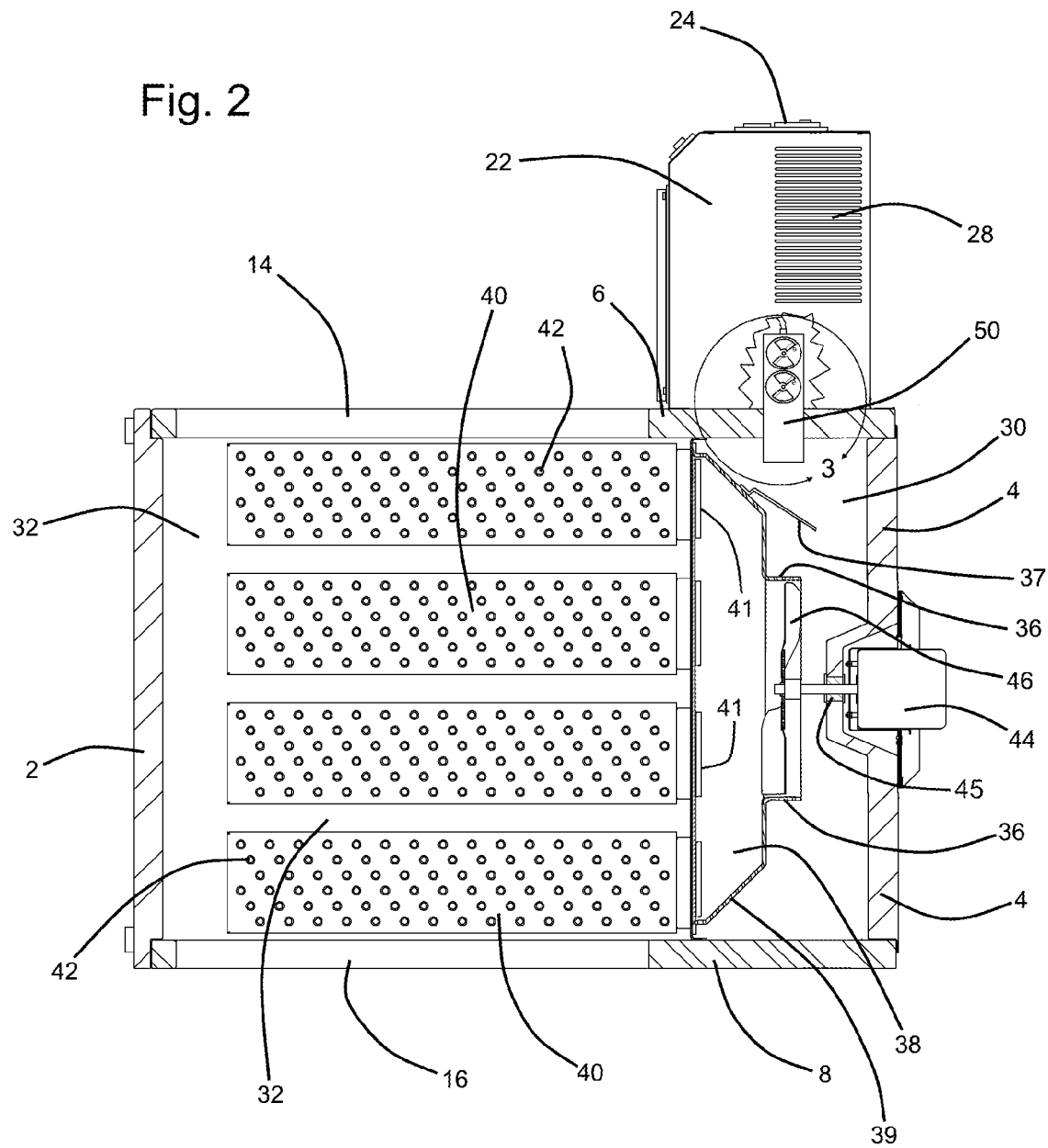
FIG. 2 is a sectional view the oven of FIG. 1, as indicated in FIG. 1.

Referring now to the drawings and in particular to FIG. 1, a preferred embodiment of the instant inventive air impingement conveyor oven is referred to generally by Reference Arrow 1. The oven 1 comprises a baking case consisting of a ceiling or top wall 10, and a floor or bottom wall 12. Referring further simultaneously to FIG. 2, the baking case further comprises a lateral or rear wall 4, an oppositely lateral or front wall 2, a longitudinal wall 6, and an oppositely longitudinal wall 8. The longitudinal wall 6 and the oppositely longitudinal wall 8 respectively include food passage ports 14 and 16. A continuous loop cooking rack type food conveyor 18 extends through the interior space of the baking case from the longitudinal wall food passage port 14 to the oppositely longitudinal wall food passage port 16. The baking case is preferably supported by a wheeled support stand 20.

Referring further simultaneously to FIGS. 1 and 2, an air plenum 39 is preferably mounted within the interior space 32,30 of the baking case, a longitudinal end of the air plenum 39 being fixedly mounted upon the baking case's longitudinal wall 6, and an oppositely longitudinal end of the air plenum 39 being similarly fixedly mounted upon the baking case's oppositely longitudinal wall 8. The vertical dimension of the air plenum 39 is preferably less than the vertical height of the interior space 32,30 of the baking case 1 so that return air may flow from the oppositely lateral portion 32 of the baking case's interior, such air passing over and under the air plenum 39, and thence into the baking case's lateral air space 30. Such mounting of the air plenum 39 within the baking case as depicted in FIG. 2, allows the air plenum 39 to effectively partition the oppositely lateral and lateral air spaces or air volumes 32 and 30, and forms ports or air upper and lower air passages through which return air may flow from the front to the rear of the oven from space 32 into space 30.

Referring to FIG. 2, the air plenum 39 preferably includes at least a first air intake port 36, such port 36 extending through the air plenum's lateral wall, the air intake port 36 preferably being configured, as depicted, as an annular fan shroud. A plurality of air impingement finger ducts 40 are also preferably provided, such ducts having air registers configured to present a multiplicity of impingement air jet forming ports 42. Outlet ports 41 within the oppositely lateral wall of the air plenum 39 are preferably provided, the proximal ends of the finger ducts 40 communicating with the outlet ports 41, such ducts oppositely laterally cantilevering therefrom.

Referring simultaneously to FIGS. 1 and 2, the air plenum outlet ports 41 and the finger ducts 40 are preferably arranged upon the oppositely lateral wall of the air plenum 39 so that separate upper and lower pluralities of the finger ducts 40 overlie and underlie the food conveyor 18. Referring in particular to FIG. 2, blower or air impelling means are provided, such means preferably comprising a fan assembly consisting of an electric motor 44 and a radial blade impeller 46. Such blower means assembly is intended as being representative of various other commonly known blower means such as "squirrel cage" or scirocco fan blowers which may be suitably substituted. The blower means 44,46 is preferably operatively mounted within the interior of the baking case so that it may, upon actuation, forcefully draw air from the lateral air space 30, through the air intake port 36 of the air plenum 39, and then may drive such air into the air plenum's interior 38. Thereafter, the blower means continues to serve as the motive force for driving such air outwardly through the air plenum's outlet ports 41 and then oppositely laterally into the finger ducts 40. Such air then emits upwardly and downwardly through impingement air jet ports 42 to perform impingement air cooking upon food items (not depicted) carried by the conveyor 18. Thereafter, the air flows from the oppositely lateral air space 32, in a recirculating fashion, above and below the air plenum 39, to return to the lateral air space 30, at which point such air may be redrawn into the air plenum's intake port 36.

In operation of the blower means 44,46, a low air pressure zone within the lateral air volume 30 results, while a correspondingly high air pressure zone within the oppositely lateral air space 32 is simultaneously created. Normal operation of conventionally known air impingement conveyor ovens requires that air flowing or driven into a low pressure laterally positioned air space, such as space 30, be restricted to such re-circulated air passing between high pressure and low pressure ends of the oven. Such conventionally imposed restriction of air flow is intended to preserve the heating and cooking efficiency of the oven. Applying what is conventionally and traditionally known in the art to the oven of the drawing figures, the walls 4, 6, 8, 10, and 12 which define and surround the lateral low pressure air space 30 would normally be designed and fabricated so that they are hermetic and imperforate. An example of such conventional design preference is represented by an air sealing bushing 45 which surrounds the rotary drive axle of the motor 44, such bushing 45 being provided to prevent aspiration of exterior room air into the low pressure air space 30.

Referring further to FIG. 2, in contrast to and in contravention of such traditional oven design convention, the instant inventive oven provides at least a first passive air flow conduit 50 which extends through one of the walls of the baking case (e.g. the longitudinal wall 6 as depicted in FIG. 2), such at least first conduit providing a first unobstructed air flow path from the outside room air into the lateral low pressure air space 30. As is shown in FIGS. 1 and 2, a control casing 22 is mounted upon the exterior of the longitudinal wall 6, such casing covering the outer opening of the at least first passive air flow conduit 50. The control casing also supports oven controls 24 and houses other oven components such as a conveyor motor and electronic circuit boards (not depicted). The control casing 22 preferably includes multiple ventilation slots 26 and 28 which allow the room air pressure to continuously equalize with the pressure in the interior of the control casing 22.

Figure 3:
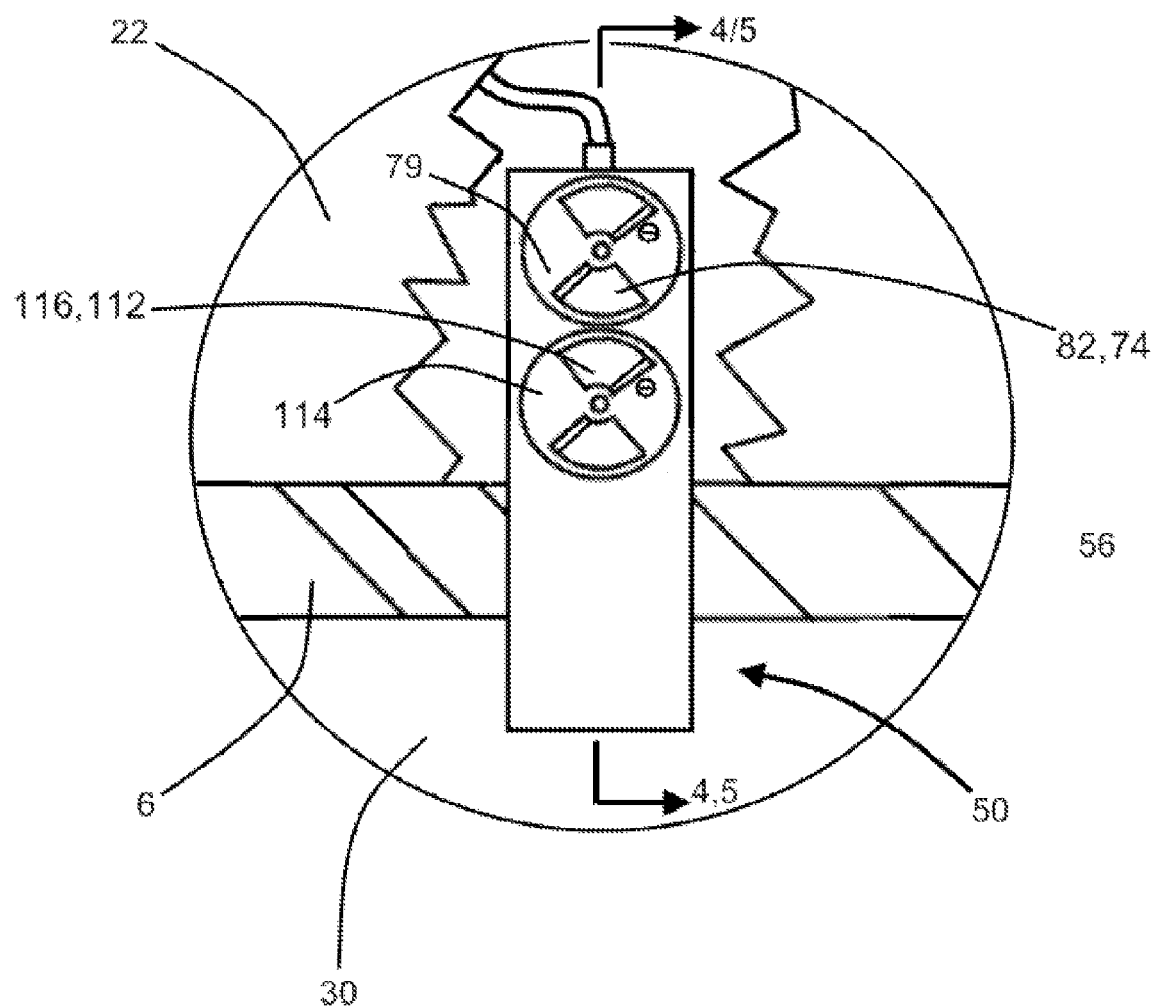
FIG. 3 is a magnified view of a portion of the structure depicted in FIG. 2, as indicated in FIG. 2.
Figure 4:
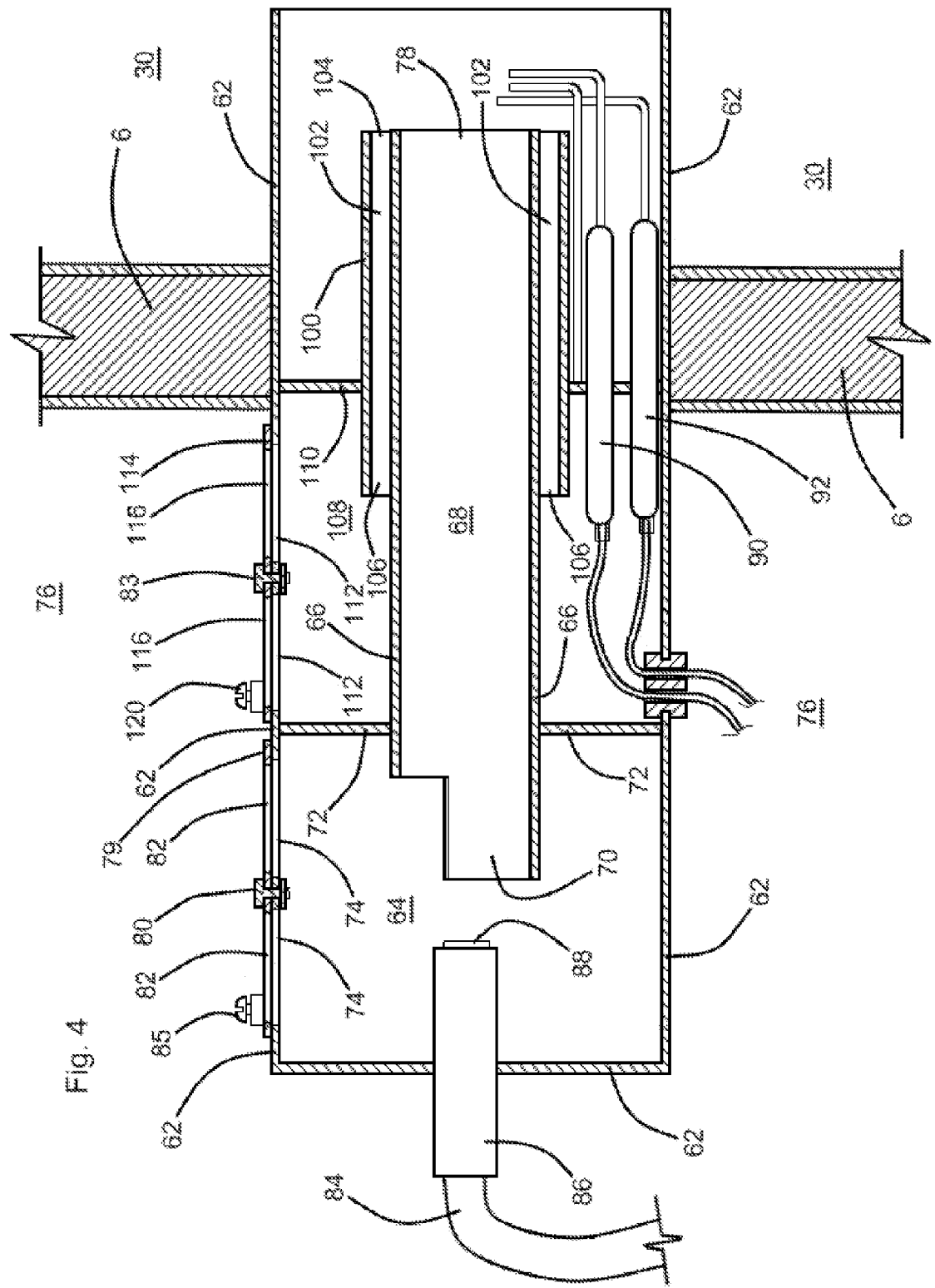
FIG. 4 is a sectional view of structure appearing in FIG. 3, as indicated in FIG. 3.

Referring simultaneously to FIGS. 3 and 4, the at least first passive air flow conduit 50 is mounted within and through, and is supported by the longitudinal wall 6. Such at least first passive air flow conduit preferably comprises a first tube 66, such first tube having a hollow bore 68. Such at least first passive air flow conduit preferably further comprises a first intake chamber 64 which is defined by a casing wall 62 and by a partitioning wall 72, the first tube 66 preferably extending through and being supported by the partitioning wall 72. The intake chamber 64 includes an intake port or aperture 74 which opens the intake chamber 64 to the outside room air 76. Accordingly, the at least first passive air flow conduit comprises the combination of the intake port 74, the intake chamber 64, the intake end 70 of the first tube 66, the hollow bore 68 of such tube, and the output end 78 of such tube. The output end 78 of such at least first passive air flow conduit is positioned so that it opens at or overlies the oven's lateral lower pressure air volume 30.

Referring further to FIG. 4, first aperture sizing means are preferably associated with the intake port 74 of the first intake chamber 64, such aperture sizing means preferably comprising valve consisting of a plate 79 which is rotatably mounted upon a pivot pin 80. The rotatable plate valve means 79 includes apertures 82 which, upon selective rotation and positioning with respect to the underlying intake ports 74, varies the effective intake size of the open outer end of the at least first passive flow conduit. A set screw 85 is preferably associated with the rotatable plate 79 to releasably secure such plate at a selected intake aperture size.

Referring simultaneously to FIGS. 1, 2, 4, and 6, upon actuation of the electric motor 44 to cause the fan 46 to draw air from the lateral air space 30 into the interior 38 of the air plenum 39, air pressure within space 30 is lowered below that of the pressure of the outside room air 76. Such air pressure differential causes the relatively cool outside room air 76 to flow through the control casing's vent slots 26 and 28 into the interior of the control casing 22, and then to flow into and through the open intake end 82,74,64,70 of the at least first passive air flow conduit. Such air then flows through the bore 68 of the first tube 66 into the oven's lateral air volume 30. Referring in particular to Drawing FIG. 6, the direction of such air flow is designated by arrows extending from the relatively high pressure (designated by "H") of the outside room environment 76 to the relatively low air pressure (designated by "L") within air space 30. According to what is conventionally known in the art, extension of an opening, such as is created by the at least first passive flow conduit, through a wall of a baking case to overlie a low pressure air space within such case, tends to aspirate cool outside air and to undesirably diminish the heating and cooking efficiency of the oven. Accordingly, air impingement conveyor ovens are typically designed to avoid and eliminate all such pressure breaching baking case openings. Notwithstanding, according to the instant invention, such undesirable diminishment of heating and cooking deficiency is countered by the association with such a typically undesirable open air conduit of combustible gas injection means and ignition means.

As is shown in FIG. 4, a propane or natural gas carrying line 85 delivers propane or natural gas to a nozzle 86, such nozzle having an output end 88 which is positioned to directly overlie the outer opening 70 of the first tube 66. The nozzle 86 extends through and is supported upon the rearward panel of the casing wall 62. Gas ignition means in the form of a spark igniter 90 and a flame sensor 92 are also preferably provided, such components being operatively mounted for igniting gas at the output end 78 of the first tube 66 and, for control purposes, sensing the existence of a flame at that location.

Figure 5:
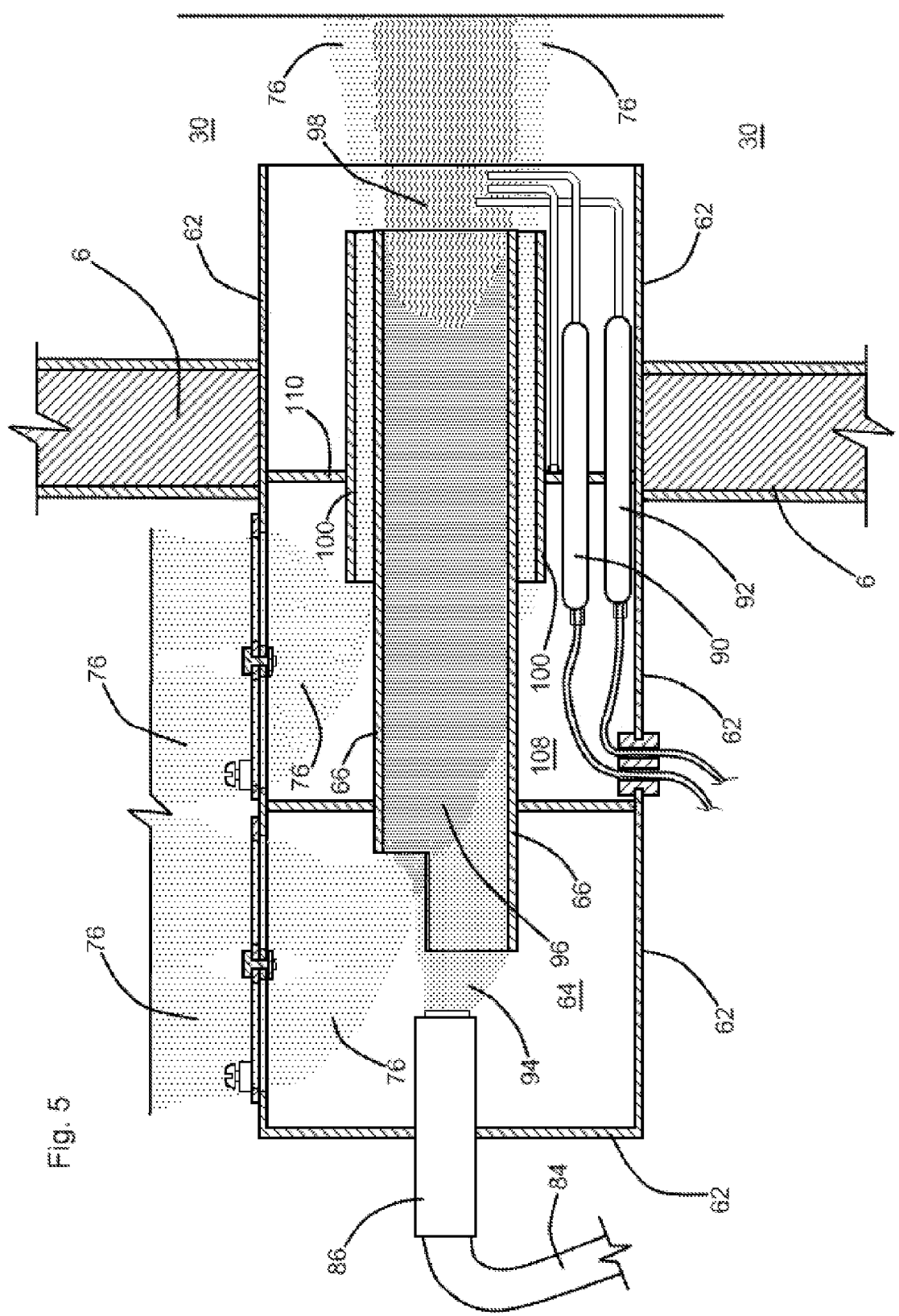
FIG. 5 redepicts FIG. 4, the view of FIG. 5 including shaded areas representationally showing gas flow.
Figure 6:
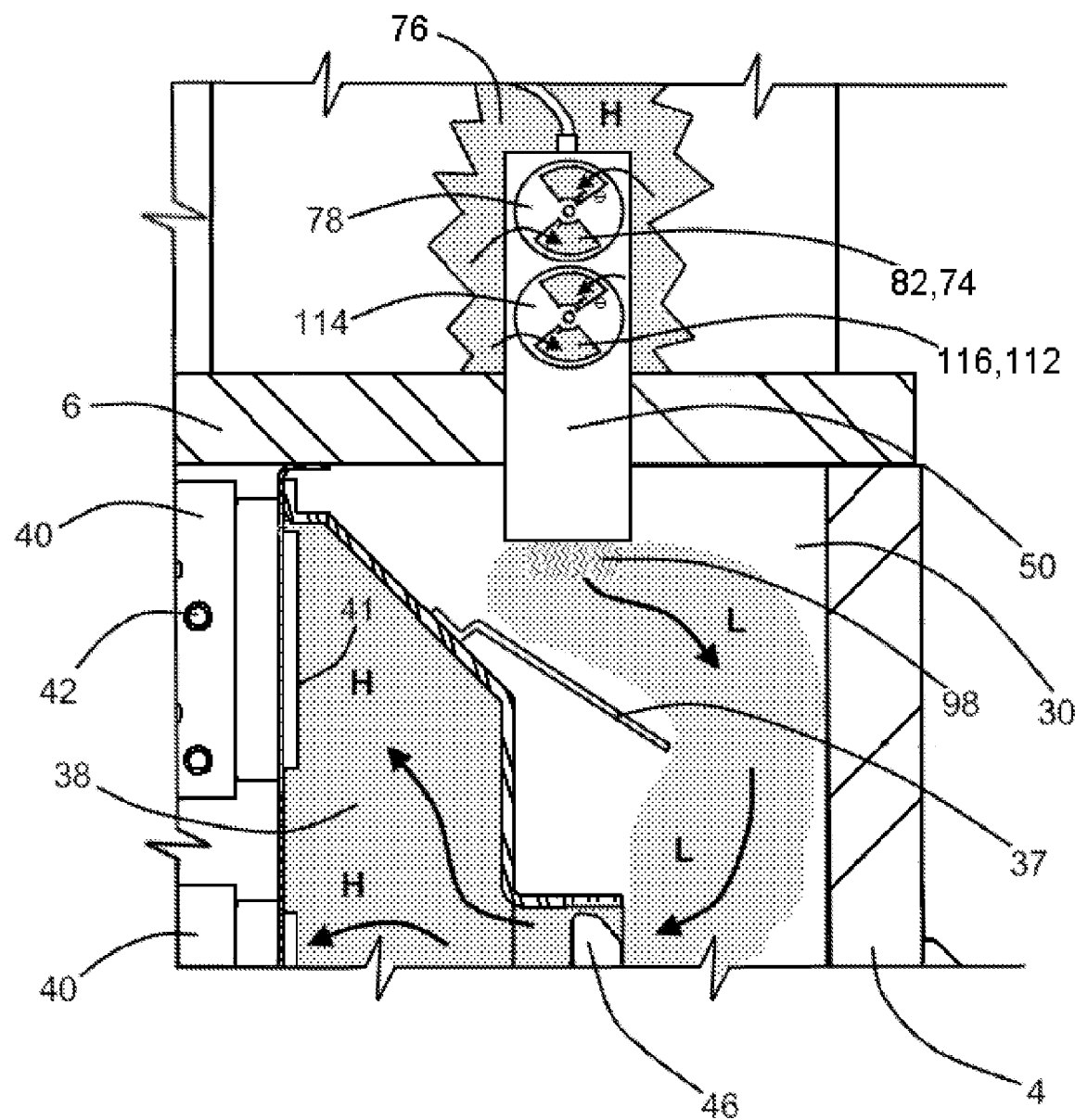
FIG. 6 redepicts and magnifies a portion of the structure depicted in FIG. 2, the view of FIG. 6 additionally representationally showing air flow.

Referring simultaneously to FIGS. 4-6, operation of the fan 46 causes outside room air 76 to be drawn, as indicated by arrows, into the at least first passive air flow conduit's open outer end 82,74. Such outside room air 76 then flows from openings 82,74 into the interior of the intake chamber 64. Such air 76 then flows into the open intake end 70 of the first tube 66, such flow also carrying natural gas or propane 94 into such intake end 70. The mixture of the outside room air 76 and the natural gas or propane 94 within the bore 68 of the first tube 66 is combustible, and an appropriate air/gas ratio may be adjusted via selective rotary setting of the valve plate 79. Upon ignition of the air/gas mixture 96 by the spark igniter 90, a flame 98 is directed into the low pressure lateral space 30 in the functional manner of a blowerless gas burner. Preferably, a baffle 37 is provided to prevent the flame 98 from impinging directly against the lateral wall of the air plenum 39.

In the preferred operation and function of the instant invention, the blower means 44,46, which traditionally and conventionally operates solely to recirculate impingement cooking air between the oppositely lateral high pressure cooking zone 32 of the oven and the lateral low pressure return zone 30 of the oven, is additionally caused to serve as a motive force for drawing combustion air into and through the at least first passive flow conduit which is structurally modified to function in the manner of a burner tube. By utilizing the 44,46 blower means to at least dually function both as means for recirculating impingement air and as the motive force for inwardly drawing combustion air, marked efficiencies are achieved. In contrast, conventional air impingement conveyor ovens, which provide a separate air blower driven burner, experience inefficiencies relative to the instant invention as the result of additional materials and components cost, excess injection of cool outside air, and imbalances which deviate from optimal fuel-air mixture ratios.

Referring to FIGS. 2-5, the blower means 44,46 is preferably further utilized as a triple functioning component to additionally draw the outside room air 76 through a second passive air flow conduit into the low pressure interior space 30, such additional or third function beneficially cooling the first tube 66. In order to facilitate such additional function, a second tube 100 is provided, such tube 100 annularly surrounding the first tube 66, and defining an air cooling annulus 102 thereabout. The second tube has an output end 104 which opens at the low pressure air space 30, and has an open intake end 106 which opens within a second intake chamber 108. The second intake chamber 108 is preferably formed and defined by the casing wall 62, the partitioning wall 72 which additionally defines the first intake chamber 64, and a second partitioning wall 110. The second tube 100 preferably extends through and is supported by such second partitioning wall 110. The second intake chamber 108 is preferably opened to the outside room air 76 by ports or apertures 112. Accordingly, the preferred second passive air flow conduit comprises, in sequence, ports or apertures 112, the second intake chamber 108, the intake end 106 of the second tube 100, the annulus 102, and the output 104 of the second tube 100. Like the at least first passive air flow conduit, the second passive air flow conduit includes aperture sizing means which preferably comprises a second valve means including a plate 114 having ports 116, the plate 114 being rotatably mounted upon pin 118. A second set screw 120 is provided for releasably fixing the plate 114 at a selected aperture size.

Referring to FIGS. 2-5, the cooling function of the preferably provided second passive air flow conduit requires that at least a portion of the first passive air flow conduit extends through the second conduit. The flame 98 tends to heat the first tube 66, and such heat tends to flow by conduction outwardly along the tube 66 to heat outer portions of the casing 62 and to heat the air 76 within the control casing 22. Such conducted heat tends to interfere with the function of electronic components which are typically additionally housed within the control casing 22. The preferred second passive air flow conduit counters such undesirable control casing heating by utilizing the air pressure drop of the low pressure air space 30 to draw outside room air 76 through the ports 116,112, into the second intake chamber 108, and then into the intake end 106 of the second tube 100. Such outside room air 76 then flows inwardly through the defined annulus 102, such air flowing around and about the outer surface of the inner tube 66. Accordingly, such secondary air flow both cools the inner tube 66 to reduce the heat that would otherwise be conducted outwardly into the interior of the control casing 22, and efficiently carries such heat inwardly into the low pressure air volume 30. By adjustably rotating the rotatable plate valve means 114, the rate of cooling air in flow may be reduced to and fixed at level at which the resultant control case cooling becomes acceptable.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. An air impingement conveyor oven comprising:
   (a) a baking case having an interior space bordered by opposing longitudinal walls, opposing lateral walls, a ceiling, and a floor;
   (b) an air plenum partitioning the baking case's interior space into an air impingement space and an air return space, the air plenum having at least a first intake port opening at the air return space, the air plenum further having a plurality of air impingement ducts extending into and opening at the air impingement space;
   (c) a first passive air flow conduit opening the baking case, the first passive air flow conduit having an output end positioned at the return air space;
   (d) combustible fuel injection and ignition means connected operatively to the first passive air flow conduit; and
   (e) air impelling means mounted operatively within the baking case for drawing impingement air from the air impingement space into the air return space, for drawing outside combustion air through the first passive air flow conduit into the air return space, and for driving said air through the air plenum's at least first intake port into the air plenum.

2. The air impingement conveyor oven of claim 1 wherein the first passive air flow conduit has an open intake end positioned outside of the baking case.

3. The air impingement conveyor oven of claim 2 wherein the first passive air flow conduit's open intake end comprises a blowerless air intake.

4. An air impingement conveyor oven comprising:
   (a) a baking case having an interior space bordered by opposing longitudinal walls, opposing lateral walls, a ceiling, and a floor;
   (b) an air plenum partitioning the baking case's interior space into an air impingement space and an air return space, the air plenum having at least a first intake port opening at the air return space, the air plenum further having a plurality of air impingement ducts extending into and opening at the air impingement space;
   (c) a first passive air flow conduit opening the baking case, the first passive air flow conduit having an output end positioned at the return air space; the first passive air flow conduit further having an open intake end comprising a blowerless air intake, the open intake end being positioned outside of the baking case;

(d) combustible fuel injection and ignition means connected operatively to the first passive air flow conduit; and (e) air impelling means mounted operatively within the baking case for drawing impingement air from the air impingement space into the air return space, for drawing outside combustion air through the first passive air flow conduit into the air return space, and for driving said air through the air plenum's at least first intake port into the air plenum; the first passive air flow conduit further comprising a tube having an intake end and an intake chamber covering the tube's intake end, the first passive air flow conduit's open intake end comprising at least a first intake aperture opening the outer wall.

5. The air impingement conveyor oven of claim 4 further comprising aperture sizing means connected operatively to the at least first aperture.

6. The air impingement conveyor oven of claim 5 wherein the aperture sizing means comprises a valve.

7. The air impingement conveyor oven of claim 6 wherein the first passive air flow conduit opens the baking case at one of the baking case's opposing longitudinal walls.

8. The air impingement conveyor oven of claim 7 further comprising a ventilated control casing fixedly attached to an outer surface of one of the opposing longitudinal walls of the baking case, the ventilated control casing being positioned to shroud the first passive air flow conduit's open intake end.

9. An air impingement conveyor oven comprising:

(a) a baking case having an interior space bordered by opposing longitudinal walls, opposing side walls, a ceiling, and a floor;

(b) an air plenum partitioning the baking case's interior space into a high pressure air space and a low pressure space, the oven's conveyor extending through the high pressure air space, the air plenum having at least a first intake port opening at the low pressure air space, the air plenum further having a plurality of air impingement ducts extending into and opening at the high pressure air space;

(c) a burner tube opening the baking case, the burner tube having an output end, the output end opening at the baking case's low pressure air space;

(d) combustible fuel injection and ignition means connected operatively to the burner tube; and (e) a dual function blower operatively mounted within the baking case for drawing combustion air through the burner tube into the low pressure air space, and for drawing air from the low pressure air space into the air plenum's at least first intake port.

10. The air impingement conveyor oven of claim 9 wherein the burner tube has an open air intake.

11. The air impingement conveyor oven of claim 10 wherein the burner tube's open air intake comprises a blowerless air intake.

12. An air impingement conveyor oven comprising:

(a) a baking case having an interior space bordered by opposing longitudinal walls, opposing side walls, a ceiling, and a floor;

(b) an air plenum partitioning the baking case's interior space into a high pressure air space and a low pressure space, the oven's conveyor extending through the high pressure air space, the air plenum having at least a first intake port opening at the low pressure air space, the air plenum further having a plurality of air impingement ducts extending into and opening at the high pressure air space;

(c) a burner tube opening the baking case, the burner tube having an output end, the output end opening at the baking case's low pressure air space;

(d) combustible fuel injection and ignition means connected operatively to the burner tube:

(e) a dual function blower operatively mounted within the baking case for drawing combustion air through the burner tube into the low pressure air space, and for drawing air from the low pressure air space into the air plenum's at least first intake port, the burner tube further having an open and blowerless air intake; and an intake chamber covering the burner tube's open air intake, and further comprising at least a first intake aperture opening the intake chamber.

13. The air impingement conveyor oven of claim 12 further comprising aperture sizing means connected operatively to the at least first intake aperture.

14. The air impingement conveyor oven of claim 13 wherein the aperture sizing means comprises a valve.

15. The air impingement conveyor oven of claim 14 wherein the burner tube extends through one of the baking case's opposing longitudinal walls.

16. The air impingement conveyor oven of claim 15 further comprising a ventilated control casing fixedly attached to an outer surface of one of the baking case's opposing longitudinal walls, the ventilated control casing being positioned to shroud the intake chamber's at least first intake aperture.

17. An air impingement conveyor oven comprising:

(a) a baking case having an interior space bordered by opposing longitudinal walls, opposing lateral walls, a ceiling, and a floor;

(b) an air plenum partitioning the baking case's interior space into an air impingement space and an air return space, the air plenum having at least a first intake port opening at the air return space, the air plenum further having a plurality of air impingement ducts extending into and opening at the air impingement space;

(c) first and second passive air flow conduits opening the baking case, the first and second passive air flow conduits having an output ends positioned at the air return space, the first passive air flow conduit having an air cooled section positioned within the second passive air flow conduit;

(d) combustible fuel injection and ignition means connected operatively to the first passive air flow conduit; and (e) air impelling means mounted operatively within the baking case for drawing impingement air from the air impingement space into the air return space, for drawing combustion air through the first passive air flow conduit into the air return space, for drawing cooling air through the second passive air flow conduit, about the first passive air flow conduit, and into the return air space, and for drawing said air through the air plenum's at least first intake port into the air plenum.

18. The air impingement conveyor oven of claim 17 wherein each passive air flow conduit has an open intake end positioned outside of the baking case.

19. The air impingement conveyor oven of claim 18 wherein each passive air flow conduit's open intake end comprises a blowerless air intake.

20. An air impingement conveyor oven comprising:
(a) a baking case having an interior space bordered by opposing longitudinal walls, opposing lateral walls, a ceiling, and a floor;
(b) an air plenum partitioning the baking case's interior space into an air impingement space and an air return space, the air plenum having at least a first intake port opening at the air return space, the air plenum further having a plurality of air impingement ducts extending into and opening at the air impingement space;
(c) first and second passive air flow conduits opening the baking case, the first and second passive air flow conduits having output ends positioned at the air return space, the first passive air flow conduit having an air cooled section positioned within the second passive air flow conduit, each passive air flow conduit having an open intake end positioned outside of the baking case, and in each passive air flow conduit's open intake end comprising a blowerless air intake:
(d) combustible fuel injection and ignition means connected operatively to the first passive air flow conduit; and
(e) air impelling means mounted operatively within the baking case for drawing impingement air from the air impingement space into the air return space, for drawing combustion air through the first passive air flow conduit into the air return space, for drawing cooling air through the second passive air flow conduit, about the first passive air flow conduit, and into the return air space, and for drawing said air through the air plenum's at least first intake port into the air plenum; each passive air flow conduit comprising a tube having an intake end and a tube intake end covering intake chamber, each passive air flow conduit's open intake end comprising at least a first intake aperture opening said each passive air flow conduit's intake chamber.

21. The air impingement conveyor oven of claim 20 further comprising first and second aperture sizing means, the first and second aperture sizing means being respectively operatively connected to the first and second passive air flow conduits' intake apertures.

22. The air impingement conveyor oven of claim 21 wherein each aperture sizing means comprises a valve.

23. The air impingement conveyor oven of claim 22 wherein the passive air flow conduits open the baking case at one of the baking case's opposing longitudinal walls.

24. The air impingement conveyor oven of claim 23 further comprising a ventilated control casing fixedly attached to an outer surface of one of the baking case's opposing longitudinal walls, the ventilated control casing being positioned to shroud the first and second passive air flow conduits' open intake ends.

25. An air impingement conveyor oven comprising:
(a) a baking case having an interior space bordered by opposing longitudinal walls, opposing side walls, a ceiling, and a floor;
(b) an air plenum partitioning the baking case's interior space into a high pressure air space and a low pressure air space, the oven's conveyor extending through the high pressure air space, the air plenum having at least a first intake port opening at the low pressure air space, the air plenum further having a plurality of air impingement ducts extending into and opening at the high pressure air space;
(c) a burner tube opening the baking case, the burner tube having an output end positioned at the baking case's low pressure air space;
(d) combustible fuel injection and ignition means connected operatively to the burner tube;
(e) an air cooling tube further opening the baking case, the burner tube extending through the air cooling tube; and
(f) a triple function blower operatively mounted within the baking case for drawing combustion air through the burner tube into the low pressure air space, for drawing cooling air through the air cooling tube about the burner tube and into the low pressure air space, and for drawing air from the high pressure air space into the low pressure air space and into the air plenum's at least first intake port.

26. The air impingement conveyor oven of claim 25 wherein the burner tube has an open air intake, and wherein the air cooling tube has an open air intake.

27. The air impingement conveyor oven of claim 26 wherein the burner tube's open air intake comprises a blowerless air intake, and wherein the air cooling tube's open air intake comprises a blowerless air intake.

28. The air impingement conveyor oven of claim 27 further comprising first and second intake chambers respectively covering the burner tube's and the air cooling tube's open air intakes, each intake chamber comprising at least a first intake aperture opening said each intake chamber.

29. The air impingement conveyor oven of claim 28 further comprising first and second aperture sizing means respectively connected operatively to the at first and second intake chambers' at least first intake apertures.

30. The air impingement conveyor oven of claim 29 wherein each aperture sizing means comprises a valve.

31. The air impingement conveyor oven of claim 30 wherein the burner and air cooling tubes extend through one of the baking case's opposing longitudinal walls.

32. The air impingement conveyor oven of claim 31 further comprising a ventilated control casing fixedly attached to an outer surface of one of the baking case's opposing longitudinal walls, the ventilated control casing being positioned to shroud the intake and air cooling tubes' open air intakes.

* * * * *